United States Patent [19]

Roelofs

[11] 4,091,150

[45] May 23, 1978

[54] COEXTRUDED POLYESTER SPLICING TAPE

[75] Inventor: Glenn E. Roelofs, Saint Paul, Minn.

[73] Assignee: Minnesota Mining and Manufacturing Company, St. Paul, Minn.

[21] Appl. No.: 720,981

[22] Filed: Sep. 7, 1976

Related U.S. Application Data

[63] Continuation-in-part of Ser. No. 491,131, Jul. 23, 1974, Pat. No. 4,011,358.

[51] Int. Cl.² .................................................. B32B 3/00
[52] U.S. Cl. ..................................... 428/57; 428/287; 428/424; 428/480; 428/520; 428/910; 51/297; 51/298 A
[58] Field of Search ............... 428/287, 480, 520, 910, 428/57, 424; 51/297, 298

[56] References Cited

U.S. PATENT DOCUMENTS

| | | | |
|---|---|---|---|
| 3,515,626 | 6/1970 | Duffield | 428/910 X |
| 3,763,604 | 10/1973 | Malloy | 51/399 |
| 3,770,555 | 11/1973 | Gladstone et al. | 428/57 X |
| 3,898,358 | 8/1975 | Ryan et al. | 428/480 X |
| 3,900,653 | 8/1975 | Riboulet et al. | 428/480 X |

FOREIGN PATENT DOCUMENTS 929,455 7/1973 Canada.

*Primary Examiner*—P. C. Ives
*Attorney, Agent, or Firm*—Cruzan Alexander; Donald M. Sell; Richard Francis

[57] ABSTRACT

A splice of abutted ends of sheet material and method of making the same employs a splicing tape formed of an adhesively coated support film which comprises a biaxially oriented, heat-set, coextruded laminate formed from a layer of a crystalline polyester material and a layer of less crystalline polyester material, with the thermosetting adhesive coating the surface of the latter layer. The splicing tape is applied with sufficient heat and pressure to cause intimate contact of the thermosetting adhesive with the abutted ends being spliced.

3 Claims, 2 Drawing Figures

COEXTRUDED POLYESTER SPLICING TAPE

CROSS-REFERENCE TO RELATED APPLICATION

This is a continuation-in-part of copending application Ser. No. 491,131, filed July 23, 1974, now U.S. Pat. No. 4,011,358, issued Mar. 8, 1977.

BACKGROUND OF THE INVENTION

The invention is a splice and method for making the same by use of a novel splicing tape which has a support film having at least two distinct but firmly united coextruded layers.

SUMMARY OF THE INVENTION

The support film is biaxially oriented and heat-set and has a highly dimensionally stable base layer formed of a crystalline thermoplastic polyester, especially polyethylene naphthalate (PEN), polycyclohexane dimethyl terephthalate (PCDT) or polyethylene terephthalate (PET), and a thin layer of a thermoplastic adhesion-promoting polyester. A layer of thermosetting adhesive material on the surface of the thermoplastic adhesion-promoting layer provides the tape. The tape is dimensionally stable, strong and tough, resisting delamination under a wide variety of use conditions, and is economical to prepare, avoiding mechanical surface treatment of films, solvent and hazardous chemical handling steps.

The method involves first abutting the ends of sheet material to form a juncture line, and then applying a continuous layer of the thermosetting adhesive material to the surface of the sheet material adjacent said ends, overlapping the juncture line. The coextruded support film is then applied over the surface of the thermosetting adhesive layer, with the adhesion-promoting layer in contact with said thermosetting adhesive layer. Thereafter, the assembly is heated and pressed with sufficient pressure and sufficient heating and for a sufficient time to cause intimate contact of the layers and curing of said thermosetting adhesive.

It has been discovered that coextruded biaxially oriented, heat-set polyester backings, where one layer is crystalline PEN, PCDT or PET, and the layer which is to be coated is oriented, but less crystalline, are not only flexible, tough, wear-resistant, chemical-resistant, strong, and have the other desirable properties of heat-set, biaxially oriented PET, PCDT or PEN film but also forms a tough, adherent bond with thermosetting adhesive materials. By contrast, a laminated film made by merely hot melt coating, emulsion coating, or solvent coating the same polyester on the surface of biaxially oriented PET, PCDT or PEN film will produce inferior products which are readily delaminated. The same is true for multi-layered films made by lamination of preformed layers using heat and pressure.

DETAILED DESCRIPTION OF THE INVENTION AND PREFERRED EMBODIMENTS

PET is prepared by reaction of terephthalic acid with ethylene glycol. In this reaction, the acid may be converted to the dimethyl ester which is allowed to react with the glycol by ester interchange. Typically, equimolar amounts of the glycol and the acid are reacted, generally in the presence of an excess of glycol. Minor amounts of another dicarboxylic acid such as isophthalic, phthalic, 2,5- or 2,7- naphthalenedicarboxylic, succinic, sebacic, adipic, azelaic, suberic, pimelic, glutaric, etc., or a diester thereof, e.g., up to 10 mole percent, may be substituted for the terephthalic acid without deleteriously affecting the properties of the resultant composite film. Additionally, minor amounts of another glycol such as 1,3-propanediol, 1,4-butanediol, neopentyl glycol, 1,4-cyclohexanedimethanol, etc., e.g., up to 10 mole percent, may be substituted for the ethylene glycol without deleterious effects.

The preparation of PEN is analogous to the preparation of PET, except that the terephthalic acid is replaced by a free dibasic acid or lower alkyl diester of 2,6-naphthalene dicarboxylic acid. The same minor amounts and types of other dibasic acids or glycols may also be included. The preparation of PCDT is analogous to the preparation of PET except the ethylene glycol is replaced by 1,4-cyclohexane dimethanol and minor amounts of another dibasic acid (not terephthalic) acid should be present to produce a film which can be biaxially oriented without substantial degradation. For this purpose, the other dibasic acid is present, on a molar basis, typically at least about 10% (preferably at least about 15%).

The thermoplastic adhesion-promoting layer is a polyester which melts below 230° C, does not crystallize rapidly, and is substantially non-crystalline between about 20° and 230° C. "Substantially non-crystalline" means not more than a minor amount of crystallinity between about 20° C and 230° C.

Preferred polyesters for use in the invention, having the properties defined above, may be produced by the condensation reaction of a dicarboxylic acid component consisting of from about 10 to about 100 mole percent of a dicarboxylic acid such as isophthalic acid, hexahydroterephthalic acid, sebacic acid, succinic acid, adipic acid, azelaic acid, suberic acid, pimelic acid, glutaric acid or mixtures thereof, or the diesters of such acids and correspondingly from 90 to zero mole percent of terephthalic acid, and a glycol component, in substantially equimolar proportions with the dicarboxylic acid component. The glycol is preferably polymethylene glycol having the formula $HO(CH_2)_nOH$, wherein $n$ is an integer of 2–10, e.g., ethylene glycol, 1,3-propanediol and 1,4-butanediol, with ethylene glycol being preferred. Other useful glycols include neopentyl glycol, 1,4-cyclohexane dimethanol and aromatic glycols such as bisphenol A.

The support film is formed by a coextrusion process wherein the individual layers meet under laminar flow conditions and are expelled from a die as an integral, multi-layer film structure. Coextruded films prepared in this manner look much like monolayer films. The freshly coextruded support film is amorphous. It is therefore endowed with improved physical properties by biaxial orientation and heat-setting. Biaxial orientation involves stretching the film in two directions normal to each other, generally in the machine direction and at right angles thereto. In a typical operation, the freshly extruded molten film is fed onto a cooling drum to produce a quenched amorphous film which is briefly heated and stretched in the machine direction, and then conducted through a tenter frame where it is stretched transversely with moderate heating. Machine direction stretching may be accomplished by passing between two sets of nip rolls, the second set rotating at a higher speed than the first. Stretching typically increases the film area by a factor of at least 6, the stretching usually being equal in each direction. For applications requiring a higher tensile support film, this factor will be larger, e.g., above 14, and the stretching may be greater in one direction than the other.

Heat-setting, or heat-stabilization of the stretched coextruded film is accomplished by restraining the film in its stretched dimension and heating briefly, then quenching. Such heating is typically in the range of 175° – 230° C.

The coextruded biaxially oriented support film should have a total thickness of at least 1 mil (about 25 microns) with at least ¼ mil (about 6 microns) of this thickness being the polyester adhesion-promoting layer. Film thicknesses up to about 10 mils (250 microns) are contemplated for the articles hereinafter described, but thicknesses in excess of 10 mils (250 microns) may be desired for some purposes. The adhesion-promoting layer should not be thicker than ¼ of the total thickness of the coextruded film and preferably is no more than 1 mil (about 25 microns) thick even for film thicknesses up to 10 mils (about 250 microns).

DRAWINGS

The invention will be better understood by referring to the drawing in which like numerals refer to like parts in the various views, both being greatly enlarged fragmentary cross-section views, wherein.

Figure 1:
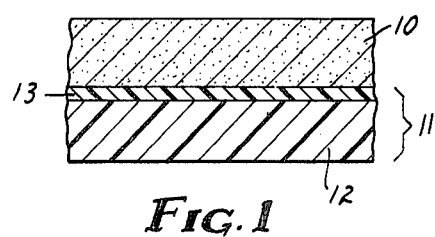
FIG. 1 depicts splicing tape as an article according to the invention.

Referring now to the drawings, FIG. 1 depicts a splicing tape having a coextruded support film 11 formed of a layer 12 of tough, flexible, dimensionally stable crystalline polyester and a layer 13 of adhesion-promoting polyester. Adherently bonded to the exposed surface of layer 13 is a layer 10 of thermosetting adhesive material. The thermosetting adhesive is capable of being formed as a self-supporting layer and, upon suitable heating, will soften and subsequently cure to a tough infusible cross-linked product. Suitable thermosetting adhesives for this purpose include polyurethanes and nylon/epoxy resin mixtures. Thermosetting adhesive layer 10 is adherently bonded to the surface of the polyester adhesion-promoting layer 13 of the coextruded support film 11.

Figure 2:
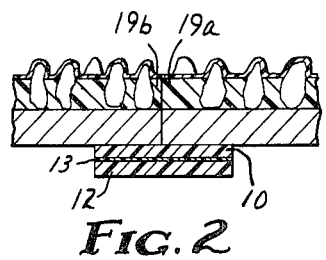
FIG. 2 depicts a splice made utilizing a splicing tape according to the invention.

A splice assembly, in accordance with the invention, is depicted in FIG. 2, utilizing the splicing tape described above. Abrasive sheet material ends 19a and 19b are butted together and joined by tape which is bonded to their non-abrasive surface or back side, the tape extending a sufficient distance on each side of the abutment of the joined ends 19a and 19b to provide an adequate area of contact and to produce a strong bond. This distance will typically be on the order of from ¼ inch to 2 inches (0.5 to 4 cm) on each side of the splice, although longer distances may be desired in some situations.

The splicing tape is applied with sufficient heat and pressure to cause intimate contact of the thermosetting adhesive layer 10 with the surface of the backing sheet of the abutted ends 19a, 19b and to result in the ultimate cure of the thermosetting adhesive. Such heat and pressure may be provided by a conventional platen press or other suitable device.

The splicing tape made in accordance with the invention has proved effective for joining coated abrasive sheet material having backing of drills cloth, other types of fabric, paper, or polymeric film.

It should be noted that a splice in accordance with the invention can be prepared by applying support film 11 directly to the back of the abutted ends of the abrasive sheet, after first coating these ends with a suitable thermosetting adhesive. That is, the splice can be made with a splicing tape which is effectively formed in situ. Similarly, per se, the thermosetting adhesive may be in the form of a self-supporting film which is interposed between the appropriate surface of support film 11 and the back surfaces of the abutted ends of the abrasive sheets. These same sequences may be followed for any other article made according to the invention.

The invention is further illustrated by reference to the following examples wherein all parts are by weight unless otherwise specified.

EXAMPLE I

Coextruded Support Film

A 3-mil (about 75 microns) coextruded support film was prepared as follows:

Granular polyethylene terephthalate resin having a solution intrinsic viscosity of 0.60 and melting point of 250° C was extruded at a barrel temperature ranging from 240° – 290° C, a die temperature of 300° C and a feed rate of 90 lbs. (about 4.1 kg) per hour, utilizing coextrusion apparatus of the type described above. Simultaneously, a granular copolyester resin having an intrinsic viscosity of 0.61, a melting point of 197° C and consisting of 80/20 poly(ethylene terephthalate/isophthalate) was extruded at a barrel temperature ranging from 200° – 300° C and a feed rate of 25 – 30 lbs. (1.1 – 1.4 kg) per hour. The resultant molten composite film was cast onto a 12-inch (4.7 cm) diameter casting wheel maintained at 60° C and rotated at 8 feet (2.5 m) per minute, producing a quenched film 30 mils (0.8 mm) in thickness having a 22 mil (0.6 mm) thick polyethylene terephthalate layer and an 8 mil (0.2 mm) thick copolyester layer. The quenched film was then oriented in the machine direction by stretching between a series of idler nip rolls having outlet nip rolls operated at three times the speed of inlet nip rolls while heating the film at 80° C. The uniaxially oriented composite film was then fed into a tenter oven heated at 95° C wherein it was stretched 3 times in the transverse direction. The biaxially oriented composite film was heat-set by briefly heating under restraint at 205° C.

A splicing tape was prepared by first knife coating the copolyester surface of the support film described above to a uniform thickness of 15 mils (0.4 mm) (wet) with a coating solution, as follows:

| Ingredients | Parts by Weight |
| --- | --- |
| Adipic acid-ethylene glycol-polyester-diisocyanate reaction product having hydroxy functionality, as a 22% solids solution in ethyl acetate. | 100 |
| Triphenyl methane triisocyanate, as a 20% solution in methylene chloride. | 7 |

The coated support layer was permitted to dry by solvent evaporation for about three hours at room temperature until a 3 mil (75 micron) thick non-tacky coating of thermosetting adhesive resulted, producing the butt-splicing tape.

A strip of the butt-splicing tape, ¾ inch by 6 inches (1.9 kg 15 cm), was utilized to splice two sheets of aluminum oxide coated abrasive drills cloth sold under the trade designation "Three-M-Ite" by the 3M Co. The splice was prepared by first abutting the ends of the abrasive cloth, with the abrasive surfaces facing one way, and overlaying the butt-splicing tape with its adhesive coated surface overlapping the juncture of the abutted ends and against the back surface (non-abrasive side) of the abrasive coated sheet. This assembly was then placed between the bars of a conventional belt splicing press having its bars maintained at 250° F (121° C), first at substantially no pressure but with contact to pre-cure the adhesive coating and then under a pressure of from about one to two tons per inch (2.5 cm by 2.5 cm) of splice length to substantially completely cure the adhesive.

The bonded assembly was then removed from the press for bond strength testing. For this purpose, a non-adherent (about 1 inch by 1 inch, 2.5 cm by 2.5 cm) silicone treated paper was previously inserted between one end of the butt-splicing tape and its adjacent backing surface to prevent adherence. The abrasive face of the abrasive sheet was clamped into one sample holding jaw of an "Instron" tensile testing device. The non-adhered end of the tape was then clamped into the remaining sample holding jaw and the tape was pulled at an angle of 90° with respect to the surface of the abrasive sheet backing, until the support film delaminated or tore or the adhesive peeled from the abrasive cloth or its support film. In this instance, the adhesive bond was stronger than the support film and the support film tore.

Utilizing the same thermosetting adhesive, coating, sealing and testing techniques, butt-splicing tapes were prepared using the support films identified in Table I below as Control Examples "A" and "B" and Examples 2–8. Peel strengths of these Examples are shown in Table I. Control Example "A" was untreated biaxially oriented, heat-set polyethylene terephthalate. Control "B" was biaxially oriented, heat-set polyethylene terephthalate film primed on one surface with parachlorophenol and coated over the primed surface with the thermosetting adhesive described above. Examples 2–8 employed, as a support film, a coextruded film consisting of a polyethylene terephthalate layer and a layer of the copolyester identified in Table I.

TABLE I

| Example | Support film thickness (microns) | Copolyester layer | Copolyester layer thickness (microns) | 90° Peel strength (kg/cm) |
|---|---|---|---|---|
| Control A | 76 | none | none | 0.4 – 0.7 |
| Control B | 76 | none | none | 0.7 – 1.4 |
| 2 | 38 – 51 | 80:20 PET:PEID[2] | 6 | 2.7 – 2.9 |
| 3 | 38 – 51 | 80:20 PET:PEN | 6 | 2.3 – 3.0 |
| 4 | 51 | 80:20 PET:PEH[3] | 6 | 1.6 – 2.1 |
| 5 | 38 – 51 | 80:20 PET:DHMT[4] | 6 | 2.3 – 3.0 |
| 6 | 76 | 80:20 PET:PEI[1] | 6 | >4.5 × 10[4] |
| 7 | 76 | 80:20 PET:PEI[1] | 12 | >4.5 × 10[4] |
| 8 | 76 | 80:20 PET:PEI[1] | 25 | >4.5 × 10[4] |

[1]polyethylene isophthalate
[2]polyethylene 1,1,3-trimethyl-5-carboxy-3-[p-carboxyphenyl] indene
[3]polyethylene hexahydroterephthalic acid
[4]poly hexamethylene glycol terephthalate
[5]support layer tore rather than adhesion failure As can be seen in Table I, Examples 2–8 had excellent peel strengths in excess of 9 lbs. per inch (1.6 kg/cm), while untreated polyethylene terephthalate had very low peel strengths of from 2 to 4 lbs. per inch (0.4 to 0.7 kg/cm). Primed polyethylene terephthalate had a peel strength of 4 to 8 lbs. per inch (0.7 to 1.4 kg/cm). As can be seen, butt splices prepared according to the invention have peel strengths of 9 to 17 lbs/in (1.6 to 3.0 kg/cm).

EXAMPLES 9–17

To demonstrate the significance of the composition of the polyester adhesion-promoting layer of the coextruded support film, Examples 9–17 were prepared. The polyester adhesion-promoting layers selected for this demonstration were made from polyesters having various mole ratios of isophthalate to terephthalate. These examples are tabulated below in Table II which sets forth, opposite the appropriate example number, the support film thickness, the percent polyethylene isophthalate (%PEI) in the polyester adhesion-promoting layer (with the remainder of the 100% being PET) and the adhesion-promoting polyester layer thickness. The base layer of the support film in each of these examples was PET.

Control Examples C and D shown in Table III were prepared by solvent casting the polyester compositions noted therein from a 5% solids hot (near boiling) dioxane solvent solution to produce a 0.1 mil (2.5 microns) (dry) coating on a 1 mil (25 microns) thick biaxially oriented heat-set polyethylene terephthalate film. The solvent coated samples were dried for a period of at least 24 hours prior to testing. Control Example A (biaxially oriented heat-set polyethylene terephthalate, with no surface treatment) and Control Example B (biaxially oriented heat-set polyethylene terephthalate which was primed with parachlorophenol) are described in Example 1.

TABLE II

| Ex. | Total thickness (microns) | %PEI | Polyester layer thickness (microns) |
|---|---|---|---|
| 9 | 50 – 75 | 100 | 6 |
| 10 | 50 – 75 | 95 | " |
| 11 | 50 – 75 | 75 | " |
| 12 | 75 | 50 | " |
| 13 | 25 | 30 | " |
| 14 | 150 | 20 | " |
| 15 | 25 | 15 | " |
| 16 | 25 | 10 | " |
| 17 | 25 | 5 | " |

TABLE III

| Control Example | Total thickness (microns) | %PEI | Polyester layer thickness (microns) |
|---|---|---|---|
| A | 75 | none | none |
| B | 75 | none | none |
| C | 28 | 50 | 2.5 |
| D | 28 | 20 | 2.5 |

The support films described in Tables II and III were coated with the thermosetting adhesive composition described in Example 1, using the coating techniques and drying conditions also described therein. Upon drying, two films were adherently bonded with application of heat and pressure to cause the thermosetting adhesive to cure. The bonded films are described in Table IV by the Example identifications used in Tables II and III; e.g., "10-10", means Example 10 film bonded to Example 10 film and "11-14" means Example 11 film bonded to Example 14 film. Bonding was always between polyester adhesion-promoting surfaces (if the film had one) or to the primed surface of PET, unless otherwise specified.

TABLE IV

| Films | 90° Peel strength (kg/cm) | Failure |
|---|---|---|
| A-A | <0.2 | adhesive to film |
| 9-9 | >2 | film tore |
| 9-14 | 1.2 | adhesive split |
| 10-10 | >2 | film tore |
| 10-14 | 1.2-1.4 | not determinable |
| 11-11 | >2 | film tore |
| 11-14 | 1.2-1.4 | not determinable |
| 12-12 | >2 | film tore |
| 12-14 | 1.25 | not determinable |
| 13-13 | >2 | film tore |
| 13-B | 0.2-0.4 | adhesive to B |
| C-B | <0.2 | adhesive to C |
| D-D | <0.2 | adhesive to D |
| 14-14 | 4.1-4.5 | adhesive split |
| 14-B | 0.2-0.4 | adhesive to B |
| 15-15 | >2 | film tore |
| 15-B | 0.2-0.4 | adhesive to B |
| 16-16 | >2 | film tore |
| 16-B | 0.2-0.4 | adhesive to B |
| 17-17 | <0.2 | adhesive to film |
| 17-B | <0.2 | adhesive to film |
| A-B | <0.2 | adhesive to A |

The results of the testing of the film sets described above revealed that films prepared according to the invention, i.e., Examples 9-16, all formed strong adherent bonds with each other. Control Example A formed a very weak bond with whichever film it was bonded to, as did Control Examples B-D. Control Examples C and D, which were prepared by solvent casting, failed quite easily during testing, unlike the films according to the invention.

By way of establishing a useful composition range of the polyester adhesion-promoting layer, testing of Examples 9-17 reveals that the polyesters containing on a mole basis from 10% to 100% isophthalate, with the remainder being terephthalate, provided strong adherent bonds. A copolyester comprised of 5% isophthalate and 95% terephthalate, i.e., Example 17, on the other hand, acted much as 100% terephthalate, i.e., Control Example A, providing a very weak bond.

EXAMPLES 18-21

Coextruded support films (each 1 mil, 25 microns in total thickness with an adhesion-promoting layer about 0.25 mil, 6 microns thick) were prepared by the procedure described in Example 1. In each case, the base layer was PET.

Composite articles identified herein as Examples 18-21, were prepared with each support film, using the thermosetting adhesive composition and coating, testing and other related techniques described in Example 1. Testing revealed that for each Example, the bond strength was excellent but the film was too thin for adequate evaluation on the "Instron" testing device. The adhesion-promoting layers of the support films are described below adjacent the example number of the composite article:

| Ex. No. | Description of adhesion-promoting layer |
|---|---|
| 18 | 90:10 PET:sebacate |
| 19 | 80:20 PET:polyoxyethylene polyol[1] |
| 20 | 80:20 PET:dimethyl orthophthalate |
| 21 | 80:20 PET:1,4-cyclohexane dimethanol |

[1]sold under the trade designation "Carbowax 200"

EXAMPLES 22-55 AND CONTROLS E AND F

TABLE V

| Ex. No. | Base Layer | Adhesion-promoting layer | 90° Peel kg/cm | Failure |
|---|---|---|---|---|
| 22 | PCDT | 80:20 PET:PEI | 1.8 | film tore |
| 23 | PEN | 80:20 PET:PEI | 1.8 | film tore |
| 24 | PEN | 80:20 PET:PEN | 1.8 | film tore |
| 25 | PEN | 100% PEI | 1.8 | film tore |
| E | PEN | none | 0.2 | adhesive to PEN |
| F[1] | PET | PCDT | 0.2 | delamination of support film |

[1]Total thickness 1 mil (25 microns)

Additional splice tapes, identified as Examples 22-25 and Control Example E in Table V above, were prepared and evaluated as hereinbefore described. The support films were 1-2 mils (25-50 microns) unless otherwise specified and prepared according to the description given in Example 1, using the same coating and drying techniques.

Evaluation as splicing tapes was according to the description given in Example 1, using the same abrasive sheet material and 90° peel strength test with the "Instron" testing device. Table V above, showing the results, reveals that splice tapes made according to the inventions, i.e., Examples 22-25 had excellent peel strengths in excess of 10 lb/in 1.8 kg/cm. Control E, on the other hand, prepared of PEN, a material herein described for the support film base layer, has poor adhesion to the adhesive composition. Example F, prepared by coextruding PET and PCDT, both materials herein defined for the base layer, easily delaminated, failing to provide an adequate supporting film.

What is claimed is:

1. A splice comprising sheet ends abutted to define a juncture line, a layer of thermoset adhesive overlapping said juncture line and adherently bonded adjacent said juncture line to the surface of said sheet ends, and adherently bonded to the surface of said layer of thermoset adhesive a biaxially oriented and heat-set coextruded film consisting essentially of (A) a base layer of dimensionally stable crystalline first polyester selected from the group consisting of polyethylene terephthalate, polycyclohexane dimethyl terephthalate and polyethylene naphthalate (B) an adhesion-promoting layer having a thickness from about one-fourth of the total thickness of said support layer to about 1 mil thick of a second polyester having a minor degree of crystallinity between about 20° C and 230° C and melting at a temperature less than about 230° C wherein said adhesion-promoting layer is a polyester produced by the condensation reaction of a dicarboxylic acid component consisting of from about 10 to about 100 mole percent of a dicarboxylic acid selected from the group consisting of isophthalic acid, hexahydroterephthalic acid, sebaic acid, succinic acid, adipic acid, azelaic acid, suberic acid, pimelic acid, glutaric acid or mixtures thereof, or the diesters of such acids and correspondingly from 90 to zero mole percent of terephthalic acid, and a glycol component, in substantially equimolar proportions with the dicarboxylic acid component, wherein the glycol component is selected from the group consisting of polymethylene glycol of the formula $HO(CH_2)_nOH$, wherein $n$ is an integer of 2–10, neopentyl glycol, 1,4-cyclohexane dimethanol and bisphenol A, said coextruded film being bonded to said thermoset layer on said adhesion-promoting layer surface.

2. The splice of claim 1 wherein said thermoset layer is polyurethane, said sheet ends are ends of coated abrasive sheet material, and said thermoset adhesive is adhered to the non-abrasive surface of said coated abrasive sheet material.

3. The splice of claim 1 wherein said sheet ends are the opposite ends of a strip of coated abrasive sheet material whereby completion of said splice produces a continuous belt.

* * * * *